(12) United States Patent
Saigo

(10) Patent No.: US 9,626,748 B2
(45) Date of Patent: Apr. 18, 2017

(54) PROJECTOR AND METHOD FOR CONTROLLING THE SAME

(71) Applicant: SEIKO EPSON CORPORATION, Tokyo (JP)

(72) Inventor: Manabu Saigo, Shiojiri (JP)

(73) Assignee: SEIKO EPSON CORPORATION, Tokyo (JP)

( * ) Notice: Subject to any disclaimer, the term of this patent is extended or adjusted under 35 U.S.C. 154(b) by 338 days.

(21) Appl. No.: 13/922,769

(22) Filed: Jun. 20, 2013

(65) Prior Publication Data
US 2014/0002503 A1 Jan. 2, 2014

(30) Foreign Application Priority Data

Jul. 2, 2012 (JP) ................................ 2012-148204
Jul. 2, 2012 (JP) ................................ 2012-148205

(51) Int. Cl.
*G06T 5/00* (2006.01)
*G03B 21/14* (2006.01)
*H04N 9/31* (2006.01)

(52) U.S. Cl.
CPC ............ *G06T 5/006* (2013.01); *G03B 21/147* (2013.01); *G06T 5/008* (2013.01); *H04N 9/3185* (2013.01)

(58) Field of Classification Search
CPC .... G03B 21/14; G03B 21/142; G03B 21/147; G06T 5/006; G06T 15/04; H04N 9/3179; H04N 9/3182; H04N 9/3185; H04N 9/3194

USPC ...................................... 353/69, 70; 345/647
See application file for complete search history.

(56) References Cited

U.S. PATENT DOCUMENTS

| 7,336,277 B1* | 2/2008 | Clark ...................... G06T 15/04 |
| | | 345/1.2 |
| 2007/0046901 A1* | 3/2007 | Kuno .............................. 353/69 |
| 2007/0058090 A1* | 3/2007 | Fujimori ....................... 348/744 |

(Continued)

FOREIGN PATENT DOCUMENTS

| JP | A-2004-289503 | 10/2004 |
| JP | 2004-349979 A | 12/2004 |

(Continued)

*Primary Examiner* — Christina Riddle
*Assistant Examiner* — Christopher Lamb, II
(74) *Attorney, Agent, or Firm* — Oliff PLC

(57) ABSTRACT

A filter coefficient calculation portion detects a maximum and a minimum of a pixel-basis deformation factor representing the degree of deformation due to trapezoidal distortion and calculates filter coefficients corresponding to a plurality of deformation factors in accordance with the range of the deformation factors (minimum to maximum). The filter coefficients are corrected by multiplying the calculated filter coefficients by a luminance correction coefficient for correcting luminance deviation due to the trapezoidal distortion, and the corrected filter coefficients are stored in a filter coefficient storage portion. A deformation factor calculation portion calculates the deformation factor in a pixel to be processed by a filter operation portion, and the filter operation portion reads the filter coefficient corresponding to the deformation factor calculated by the deformation factor calculation portion from a filter coefficient storage portion. The filter operation portion then performs filtering.

17 Claims, 8 Drawing Sheets

(56) References Cited

U.S. PATENT DOCUMENTS

2009/0002398 A1    1/2009  Goerzen
2012/0105813 A1*   5/2012  Todoroki .................. 353/69

FOREIGN PATENT DOCUMENTS

| JP | 2009-065639 A | 3/2009 |
| JP | 2011-193332 A | 9/2011 |

* cited by examiner

PROJECTOR AND METHOD FOR CONTROLLING THE SAME

The entire disclosure of Japanese Patent Application Nos. 2012-148204, filed Jul. 2, 2012 and 2012-148205, filed Jul. 2, 2012 are expressly incorporated by reference herein.

BACKGROUND

1. Technical Field

The present invention relates to a projector that projects an image and a method for controlling the projector.

2. Related Art

When an installed projector that projects an image is inclined to a projection surface, a displayed image is deformed into a trapezoidal shape or trapezoidal distortion occurs. Further, when a projector is inclined, the distance between the image and the projector greatly changes depending on the position in the image, disadvantageously resulting in a luminance deviation. In view of the problem described above, a projector (liquid crystal projector apparatus) capable of adjusting the luminance when the trapezoidal distortion is corrected has been proposed (see JP-A-2004-289503, for example).

However, providing a circuit for correcting trapezoidal distortion as well as a circuit for adjusting the luminance, as described with reference to the projector in JP-A-2004-289503, complicates the circuit configuration of the projector and hence increases the cost thereof.

SUMMARY

An advantage of some aspects of the invention is to solve at least a part of the problems described above, and the invention can be implemented in the form of the following aspects or application examples.

Application Example 1

This application example is directed to a projector that projects an image based on image information and includes a parameter generation section that generates filter coefficients used in filtering for correction of trapezoidal distortion of the image, a correction processing section that performs the filtering on the image information by using the filter coefficients generated by the parameter generation section, and an image projection section that projects the image based on the image information corrected by the correction processing section, and the parameter generation section includes a coefficient generation portion that generates the filter coefficients in such a way that the trapezoidal distortion is corrected and a coefficient adjustment portion that adjusts the filter coefficients in such a way that luminance deviation due to the trapezoidal distortion is corrected.

According to the projector of this application example, since luminance deviation is corrected by adjusting the filter coefficients for correcting trapezoidal distortion, the configuration of a circuit that corrects trapezoidal distortion based on the filtering can be used also to make the luminance uniform. That is, it is not necessary to newly add a circuit for making the luminance uniform.

Application Example 2

In the projector according to the application example described above, the coefficient generation portion may relate the filter coefficients when generated to deformation factors each representing the degree of deformation of the image due to trapezoidal distortion, and the coefficient adjustment portion may adjust each of the filter coefficients generated by the coefficient generation portion in accordance with the deformation factor corresponding to the filter coefficient.

Application Example 3

In the projector according to the application example described above, the coefficient adjustment portion may multiply each of the filter coefficients generated by the coefficient generation portion by a luminance correction coefficient according to the deformation factor corresponding to the filter coefficient.

Application Example 4

In the projector according to the application example described above, the correction processing section may include a deformation factor calculation portion that calculates the deformation factor for each position in the image and a filter operation portion that performs the filtering by selecting one of the filter coefficients generated by the parameter generation section that corresponds to the deformation factor calculated by the deformation factor calculation portion.

Application Example 5

In the projector according to the application example described above, it is preferable that the coefficient adjustment portion adjusts the amount of correction on the luminance in accordance with a range of possible values of the deformation factor in the image information corrected by the correction processing section in terms of the trapezoidal distortion.

According to the projector of this application example, since the coefficient adjustment portion, which corrects luminance deviation in accordance with the deformation factors, adjusts the amount of correction on the luminance in accordance with the range of possible values of the deformation factors, that is, the distribution of the deformation factors, the luminance can be corrected appropriately by the amount corresponding to the distribution of the deformation factors, whereby an image having undergone the luminance correction will not be too bright or too dim.

Application Example 6

In the projector according to the application example described above, the correction processing section may include a deformation factor calculation portion that calculates the deformation factor for each position in the image and a filter operation portion that performs the filtering by selecting one of the filter coefficients generated by the parameter generation section that corresponds to the deformation factor calculated by the deformation factor calculation portion.

Application Example 7

The projector according to the application example described above may further include a range detection portion that detects a minimum and a maximum of the deformation factor in the image, and the coefficient adjustment portion may adjust the amount of correction on the luminance in such a way that the luminance is unchanged when the deformation factor has a predetermined value between the minimum and the maximum.

Application Example 8

The projector according to the application example described above may further include an average calculation portion that averages the deformation factors in the image, and the coefficient adjustment portion may adjust the amount of correction on the luminance in such a way that the luminance is unchanged when the deformation factor is equal to the average.

Application Example 9

This application example is directed to a method for controlling a projector that projects an image based on image information. The method includes a parameter generation step of generating filter coefficients used in filtering for correction of trapezoidal distortion of the image, a correction processing step of performing the filtering on the image information by using the filter coefficients generated in the parameter generation step, and an image projection step of projecting the image based on the image information corrected in the correction processing step, and the parameter generation step includes a coefficient generation step of generating the filter coefficients in such a way that the trapezoidal distortion is corrected and a coefficient adjustment step of adjusting the filter coefficients in such a way that luminance deviation due to the trapezoidal distortion is corrected.

According to the method for controlling a projector of this application example, since luminance deviation is corrected by adjusting the filter coefficients for correcting trapezoidal distortion, the configuration of a circuit that corrects trapezoidal distortion based on the filtering can be used also to make the luminance uniform. That is, it is not necessary to newly add a circuit for making the luminance uniform.

Application Example 10

In the method for controlling a projector according to the application example described above, in the coefficient generation step, the filter coefficients when generated may be related to deformation factors each representing the degree of deformation of the image due to trapezoidal distortion, and in the coefficient adjustment step, each of the filter coefficients generated in the coefficient generation step may be adjusted in accordance with the deformation factor corresponding to the filter coefficient.

Application Example 11

In the method for controlling a projector according to the application example described above, in the coefficient adjustment step, each of the filter coefficients generated in the coefficient generation step may be multiplied by a luminance correction coefficient according to the deformation factor corresponding to the filter coefficient.

Application Example 12

In the method for controlling a projector according to the application example described above, the correction processing step may include a deformation factor calculation step of calculating the deformation factor for each position in the image and a filter operation step of performing the filtering by selecting one of the filter coefficients generated in the parameter generation step that corresponds to the deformation factor calculated in the deformation factor calculation step.

Application Example 13

In the method for controlling a projector according to the application example described above, in the coefficient adjustment step, the amount of correction on the luminance is desirably adjusted in accordance with a range of possible values of the deformation factor in the image information corrected in the correction processing step in terms of the trapezoidal distortion.

According to the method for controlling a projector of this application example, since in the coefficient adjustment step, in which luminance deviation is corrected in accordance with the deformation factors, the amount of correction on the luminance is adjusted in accordance with the range of possible values of the deformation factors, that is, the distribution of the deformation factors, the luminance can be corrected appropriately by the amount corresponding to the distribution of the deformation factors, whereby an image having undergone the luminance correction will not be too bright or too dim.

Application Example 14

In the method for controlling a projector according to the application example described above, the correction processing step may include a deformation factor calculation step of calculating the deformation factor for each position in the image and a filter operation step of performing the filtering by selecting one of the filter coefficients generated in the parameter generation step that corresponds to the deformation factor calculated in the deformation factor calculation step.

Application Example 15

The method for controlling a projector according to the application example described above may further include a range detection step of detecting a minimum and a maximum of the deformation factor in the image, and in the coefficient adjustment step, the amount of correction on the luminance may be adjusted in such a way that the luminance is unchanged when the deformation factor has a predetermined value between the minimum and the maximum.

Application Example 16

The method for controlling a projector according to the application example described above may further include an average calculation step of averaging the deformation factors in the image, and in the coefficient adjustment step, the amount of correction on the luminance may be adjusted in such a way that the luminance is unchanged when the deformation factor is equal to the average.

When the projector and the method for controlling the same described above are configured by using a computer, the aspects and the application examples described above can also be configured in the form of a program for providing the functions described in the aspects and the application examples or a recording medium or any other component on which the program is so recorded that it is readable by the computer. The recording medium can be a flexible disk; a hard disk; a CD, a DVD, and other optical disks; a magneto-optical disk; a memory card and a USB memory in which a nonvolatile semiconductor memory is incorporated; an internal storage device in the projector (RAM, ROM, or any other semiconductor memory); and a variety of other media readable by the computer.

BRIEF DESCRIPTION OF THE DRAWINGS

The invention will be described with reference to the accompanying drawings, wherein like numbers reference like elements.

FIG. 2A shows an image drawn in a pixel area of a liquid crystal light valve based on pre-correction image information (pre-correction image); FIG. 2B shows a projected pre-correction image; FIG. 2C shows an image drawn in the pixel area based on post-correction image information (post-correction image); and FIG. 2D shows a projected post-correction image.

FIG. 3A shows the pre-correction image drawn in the pixel area; and FIG. 3B shows the post-correction image drawn in the pixel area.

FIG. 8A shows a graph in a case where the inclination of the projector with respect to a projection surface is relatively small; and FIG. 8B shows a graph in a case where the inclination of the projector with respect to the projection surface is relatively large.

DESCRIPTION OF EXEMPLARY EMBODIMENTS

First Embodiment

A projector according to a first embodiment will be described below with reference to the drawings.

Figure 1:
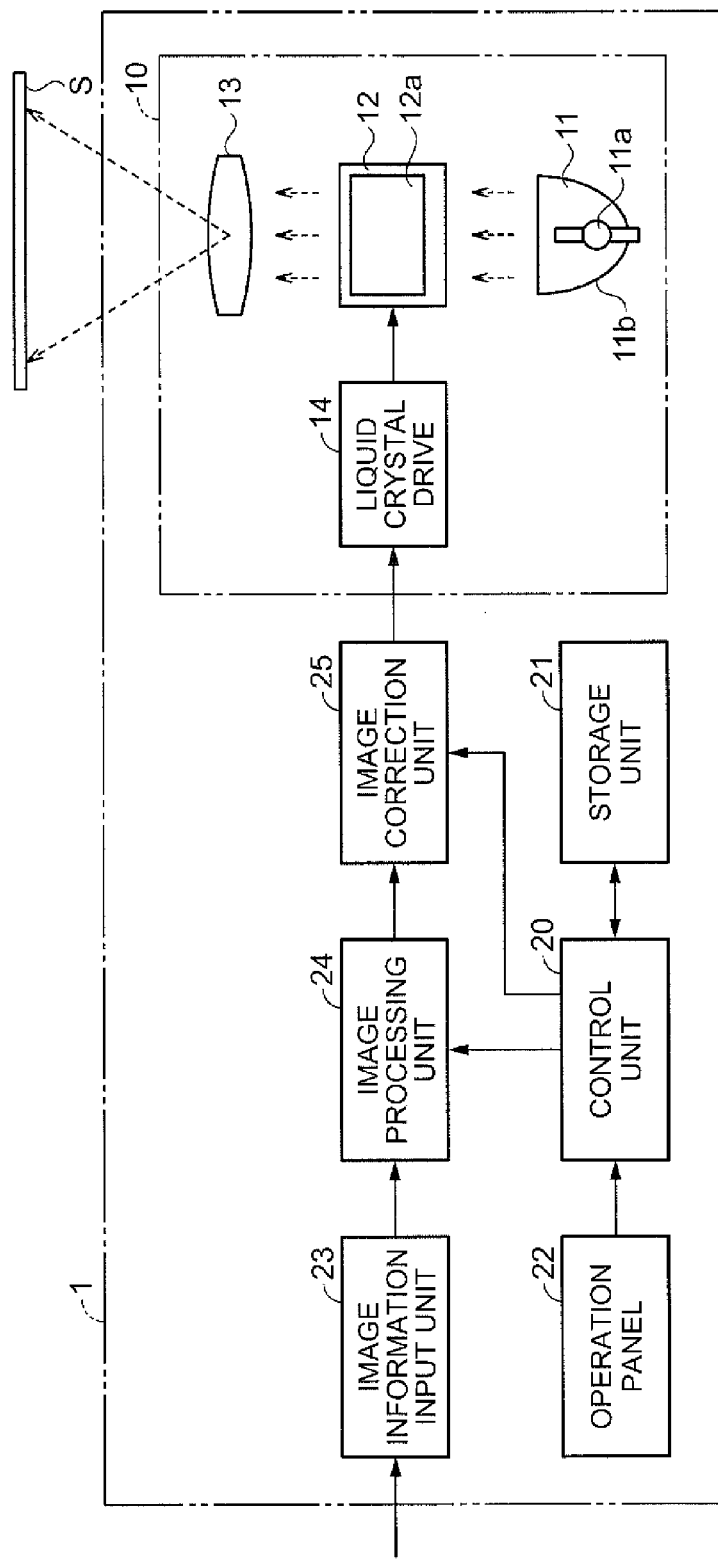
FIG. 1 is a block diagram showing a schematic configuration of a projector.

FIG. 1 is a block diagram showing a schematic configuration of a projector 1.

The projector 1 includes an image projection section 10, a control unit 20, a storage unit 21, an operation panel 22, an image information input unit 23, an image processing unit 24, and an image correction unit 25, as shown in FIG. 1.

The image projection section 10 is formed, for example, of a light source portion 11 as a light source, a liquid crystal light valve 12 as a light modulator, a projection lens 13 as a projection system, and a liquid crystal driver 14. The image projection section 10, which corresponds to a display section, uses the liquid crystal light valve 12 to modulate light outputted from the light source portion 11 into image light and projects the image light through the projection lens 13 to display an image on a projection surface S.

The light source portion 11 includes a discharge-type light source lamp 11a, which is formed, for example, of an ultrahigh-pressure mercury lamp or a metal halide lamp, and a reflector 11b, which reflects light emitted from the light source lamp 11a toward the liquid crystal light valve 12. The light outputted from the light source portion 11 is converted by an optical integration system (not shown) into light having a substantially uniform luminance distribution and incident on the liquid crystal light valve 12.

The liquid crystal light valve 12 is formed, for example, of a transmissive liquid crystal panel in which a pair of transparent substrates seal a liquid crystal material. The liquid crystal light valve 12 has a rectangular pixel area 12a, in which a plurality of pixels (not shown) are arranged in a matrix, and a drive voltage is applicable to the liquid crystal material on a pixel basis. When the liquid crystal driver 14 applies a drive voltage according to inputted image information to each of the pixels, the pixel is set to have light transmittance according to the image information. The light outputted from the light source portion 11 is therefore modulated when passing through the pixel area 12a of the liquid crystal light valve 12 to form image light according to the image information, which is enlarged and projected through the projection lens 13. In the present specification, setting the light transmittance of each of the pixels in the liquid crystal light valve 12 (pixel area 12a) based on image information is also called "drawing an image."

The control unit 20 includes a CPU (central processing unit) and a RAM (random access memory) used to temporarily store, for example, a variety of data. The control unit 20, in which the CPU acts in accordance with a control program stored in the storage unit 21, controls the action of the projector 1. That is, the control unit 20 along with the storage unit 21 functions as a computer.

The storage unit 21 is formed of a flash memory, a mask ROM (read only memory), or any other nonvolatile memory. The storage unit 21 stores, for example, the control program for controlling the action of the projector 1 and a variety of setting data that specify action conditions and other parameters of the projector 1.

The operation panel 22, which corresponds to an input operation section that receives input operation performed by a user, includes a plurality of operation keys (not shown) that allow the user to issue a variety of instructions to the projector 1. When the user operates any of the variety of operation keys on the operation panel 22, the operation panel 22 receives the operation and outputs a control signal corresponding to the operated operation key to the control unit 20. Upon the input of the control signal from the operation panel 22, the control unit 20 carries out a process based on the inputted control signal to control the action of the projector 1. The operation panel 22 may alternatively be formed of or may be used with a remote control (not shown) that allows remote operation as the input operation section. In this case, the remote control transmits an infrared-light operation signal according to operation performed by the user, and a remote control signal receiver (not shown) receives the operation signal and forwards it to the control unit 20.

The image information input unit 23 has a plurality of input terminals to which image information in a variety of formats is inputted from an external image supply apparatus (not shown), such as a video reproduction apparatus and a personal computer. The image information input unit 23 performs, for example, signal conversion on the inputted image information as required and outputs the converted image information to the image processing unit 24.

The image processing unit 24 converts the image information inputted from the image information input unit 23 into image information representing the grayscale of each of the pixels in the liquid crystal light valve 12, that is, image information for specifying a drive voltage applied to each of the pixels. The converted image information contains a plurality of pixel values corresponding to the pixels in the liquid crystal light valve 12. Each of the pixel values determines light transmittance of the corresponding pixel and hence specifies the luminance of light that exits out of the pixel. The image processing unit 24 further performs the following processing as required on the converted image information based on instructions from the control unit 20: adjustment of brightness, contrast, sharpness, and other image-quality-related parameters; and superposition of a menu image and other OSD (on-screen display) images and display of the resultant image. The image processing unit 24 then outputs the processed image information to the image correction unit 25.

The image correction unit 25 carries out a process of correcting trapezoidal distortion produced when an image is obliquely projected onto the projection surface S. Specifically, the image correction unit 25 performs filtering on the image information inputted from the image processing unit 24 (pre-correction image information) in such a way that the projected image is distorted into a shape that can cancel the trapezoidal distortion and supplies the liquid crystal driver 14 with the processed image information as post-correction image information. Thereafter, when the liquid crystal driver 14 drives the liquid crystal light valve 12 in accordance with the post-correction image information inputted from the image correction unit 25, the image with the trapezoidal distortion corrected is projected onto the projection surface S.

Figure 2C:
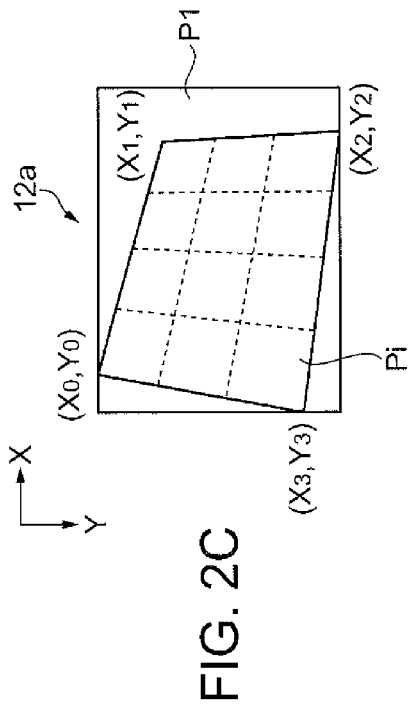
FIGS. 2A to 2D are descriptive views for describing trapezoidal distortion correction.
Figure 2D:
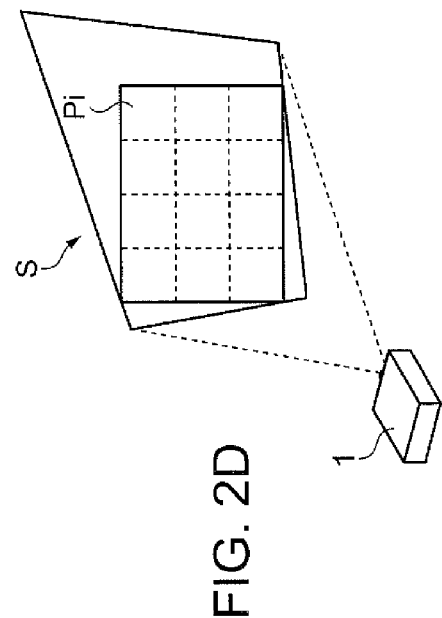
Figure 2A:
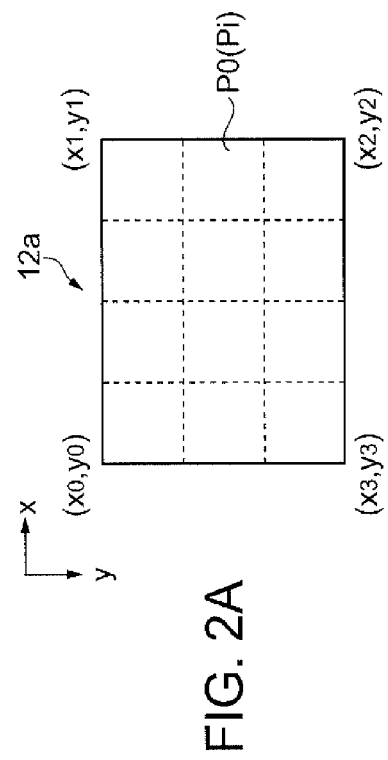
Figure 2B:
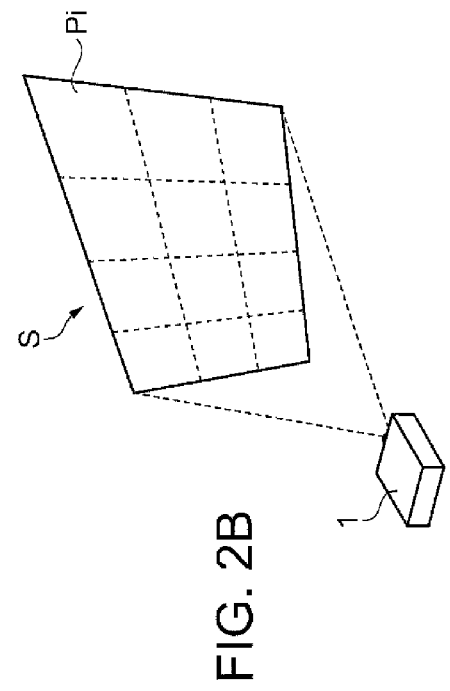

FIGS. 2A to 2D are descriptive views for describing the trapezoidal distortion correction. FIG. 2A shows an image drawn in the pixel area 12a of the liquid crystal light valve 12 based on pre-correction image information (pre-correction image). FIG. 2B shows a projected pre-correction image. FIG. 2C shows an image drawn in the pixel area 12a based on post-correction image information (post-correction image). FIG. 2D shows a projected post-correction image.

When an image based on the image information inputted from the image processing unit 24 (input image Pi) is drawn as a pre-correction image P0 across the pixel area 12a as shown in FIG. 2A and obliquely projected onto the projection surface S, the input image Pi is displayed but distorted due to trapezoidal distortion as shown in FIG. 2B. On the other hand, distorting the pre-correction image P0 (input image Pi) in the direction opposite to the direction in which the trapezoidal distortion is produced and projecting the resultant post-correction image P1 having pixels outside the input image Pi set to have black pixel values, that is, pixel values having minimum light transmittance, on the projection surface S as shown in FIG. 2C allows the trapezoidal distortion to be canceled and the input image Pi to be displayed as a rectangular image as shown in FIG. 2D. It is now assumed that the coordinates of the four apexes of the pre-correction image P0 (pixel coordinates), that is, the upper left, upper right, lower right, and lower left apexes, are $(x_0, y_0)$, $(x_1, y_1)$, $(x_2, y_2)$, and $(x_3, y_3)$ respectively, and that the coordinates of the points in the post-correction image P1 that correspond to the four apexes are $(X_0, Y_0)$, $(X_1, Y_1)$, $(X_2, Y_2)$, and $(X_3, Y_3)$ respectively, as shown in FIGS. 2A to 2D. The degree of deformation (deformation factor) of the post-correction image P1 with respect to the pre-correction image P0 varies depending on the position (coordinates) in the image. For example, in the case shown in FIGS. 2A to 2D, the degree of image reduction is greater in positions in the vicinity of the apex $(X_1, Y_1)$ than in positions in the vicinity of the apex $(X_3, Y_3)$.

Figure 3A:
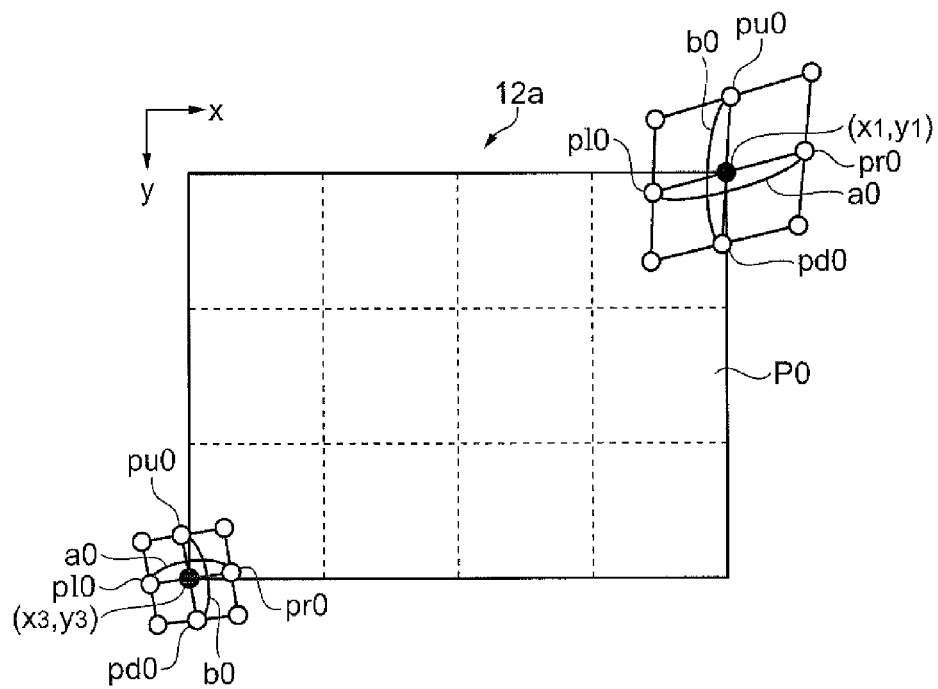
FIGS. 3A and 3B are descriptive views for describing a deformation factor.
Figure 3B:
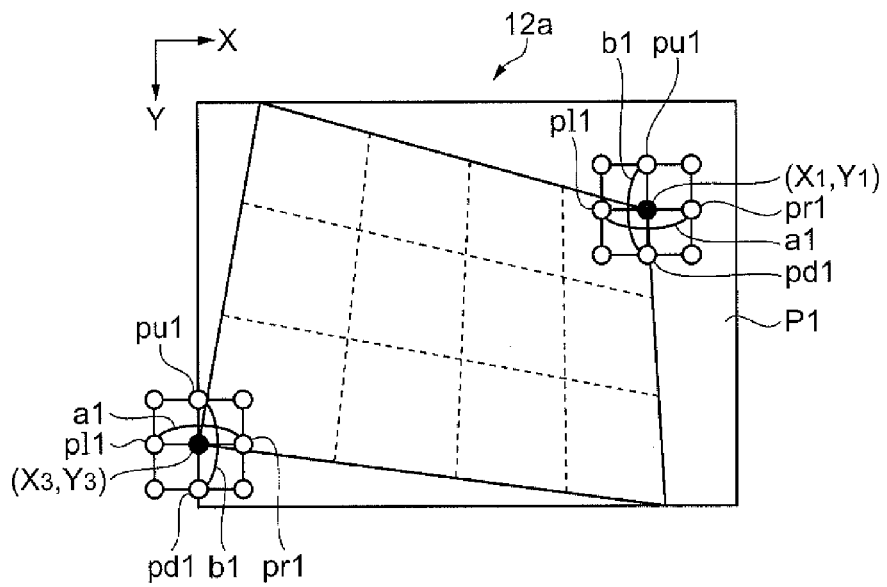

FIGS. 3A and 3B are descriptive views for describing the deformation factor. FIG. 3A shows the pre-correction image P0 drawn in the pixel area 12a, and FIG. 3B shows the post-correction image P1 drawn in the pixel area 12a. FIGS. 3A and 3B show two pixels of interest as representative pixels at the upper right and lower left apexes and describe the deformation factor of each of the two pixels. The pixels of interest and pixels therearound are exaggerated for ease of description by enlarging the size of the pixels and the distance therebetween.

In the post-correction image P1, let a1 be the distance between a pixel pl1 immediately to the left of a pixel of interest and a pixel pr1 immediately to the right of the pixel of interest, and let b1 be the distance between a pixel pu1 immediately above the pixel of interest and a pixel pd1 immediately below the pixel of interest, as shown in FIG. 3B. In the pre-correction image P0, let a0 be the distance between a pixel pl0 corresponding to the pixel pl1 and a pixel pr0 corresponding to the pixel pr1, and let b0 be the distance between a pixel pu0 corresponding to the pixel pu1 and a pixel pd0 corresponding to the pixel pd1, as shown in FIG. 3A. In this embodiment, a1/a0 is defined as a deformation factor $\epsilon_x$ in the pixel of interest in the horizontal direction (direction X), and b1/b0 is defined as a deformation factor $\epsilon_y$ in the pixel of interest in the vertical direction (direction Y). When the deformation factors $\epsilon_x$ and $\epsilon_y$ are defined as described above, the deformation factors $\epsilon_x$ and $\epsilon_y$ in positions in the vicinity of the apex $(X_1, Y_1)$ are smaller than those in positions in the vicinity of the apex $(X_3, Y_3)$. The definition of the deformation factors $\epsilon_x$ and $\epsilon_y$ is not necessarily made as described above. For example, the ratio of the inter-pixel distance a1 to the x-direction component of the inter-pixel distance a0 and the ratio of the inter-pixel distance b1 to the y-direction component of the inter-pixel distance b0 may be defined as the deformation factors $\epsilon_x$ and $\epsilon_y$, respectively.

Figure 4:
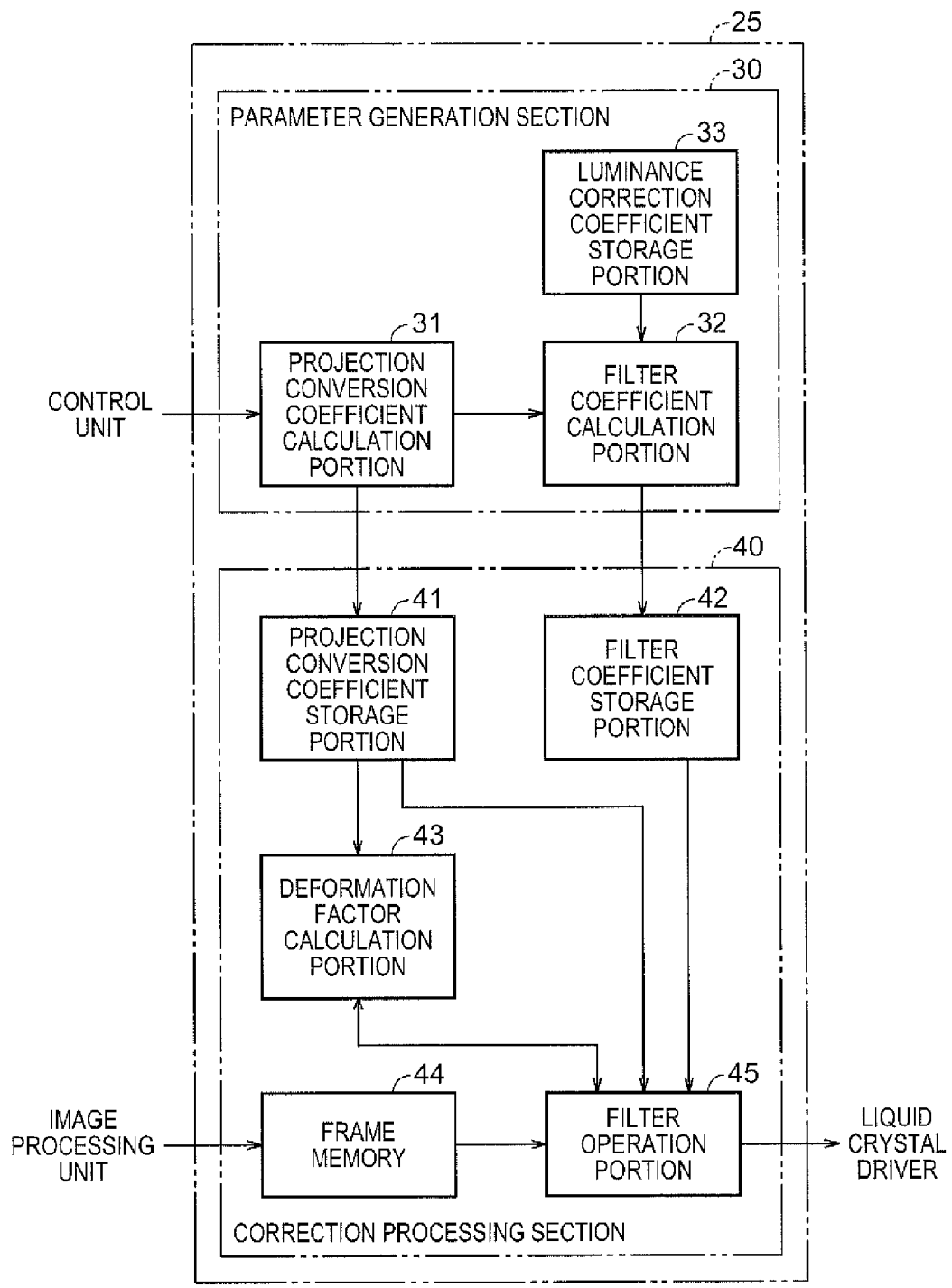
FIG. 4 is a block diagram showing the configuration of an image correction unit.

FIG. 4 is a block diagram showing the configuration of the image correction unit 25.

The image correction unit 25 includes a parameter generation section 30 and a correction processing section 40, as shown in FIG. 4.

The parameter generation section 30 includes a projection conversion coefficient calculation portion 31, a filter coefficient calculation portion 32, and a luminance correction coefficient storage portion 33 and generates parameters for correcting trapezoidal distortion (projection conversion coefficient and filter coefficient) in accordance with the inclination of the projector 1.

The projection conversion coefficient calculation portion 31 receives inclination information according to the inclination of the projector 1 as an input from the control unit 20. The control unit 20, for example, uses an imaging unit (not shown) to capture an image of the projection surface S on which the pre-correction image P0 is projected, derives inclination information representing the inclination of the projection surface S with respect to the projector 1, and outputs the inclination information to the projection conversion coefficient calculation portion 31. The method for deriving the inclination information is not limited to the method described above, and the inclination information may alternatively be derived by using an acceleration sensor or any other device (not shown) to detect the inclination of the projector 1 or by prompting the user to operate the operation panel 22 or the remote control to specify or input the inclination information.

The projection conversion coefficient calculation portion 31 calculates the coordinates $(X_0, Y_0)$, $(X_1, Y_1)$, $(X_2, Y_2)$, and $(X_3, Y_3)$ of the four apexes of the post-correction image P1 based on the inclination information inputted from the control unit 20. Further, the projection conversion coefficient calculation portion 31 uses the calculated coordinates of the apexes of the post-correction image P1 to calculate projection conversion coefficients that define conversion from the pre-correction image P0 to the post-correction image P1. It is assumed as described above that the coordinates of the four apexes of the pre-correction image P0, the upper left, upper right, lower right, and lower left apexes, are $(x_0, y_0)$, $(x_1, y_1)$, $(x_2, y_2)$, and $(x_3, y_3)$, and that the coordinates of the four apexes of the post-correction image P1 are $(X_0, Y_0)$, $(X_1, Y_1)$, $(X_2, Y_2)$, and $(X_3, Y_3)$. A projection conversion determinant expressed by Expression (1) is then established by using eight projection conversion coefficients A to H. The projection conversion coefficient calculation portion 31 calculates the projection conversion coefficients A to H from Expression (1) and outputs the calculation result to the filter coefficient calculation portion 32 and the correction processing section 40.

$$\begin{pmatrix} X_0 & Y_0 & 1 & 0 & 0 & 1 & -x_0 X_0 & -x_0 Y_0 \\ 0 & 0 & 0 & X_0 & Y_0 & 0 & -y_0 X_0 & -y_0 Y_0 \\ X_1 & Y_0 & 1 & 0 & 0 & 1 & -x_1 X_1 & -x_1 Y_1 \\ 0 & 0 & 0 & X_1 & Y_1 & 0 & -y_1 X_1 & -y_1 Y_1 \\ X_2 & Y_2 & 1 & 0 & 0 & 1 & -x_2 X_2 & -x_2 Y_2 \\ 0 & 0 & 0 & X_2 & Y_2 & 0 & -y_2 X_2 & -y_2 Y_2 \\ X_3 & Y_3 & 1 & 0 & 0 & 1 & -x_3 X_3 & -x_3 Y_3 \\ 0 & 0 & 0 & X_3 & Y_3 & 0 & -y_3 X_3 & -y_3 Y_3 \end{pmatrix} \begin{pmatrix} A \\ B \\ C \\ D \\ E \\ F \\ G \\ H \end{pmatrix} = \begin{pmatrix} x_0 \\ y_0 \\ x_1 \\ y_1 \\ x_2 \\ y_2 \\ x_3 \\ y_3 \end{pmatrix} \quad (1)$$

Provided that the pre-correction image P0 is converted into the post-correction image P1 based on the projection conversion described above, the coordinates (z, y) in the pre-correction image P0 that correspond to arbitrary coordinates (X, Y) in the post-correction image P1 can be derived from the following Expressions (2) and (3):

$$x = \frac{AX + BY + C}{GX + HY + 1} \quad (2)$$

$$y = \frac{DX + EY + F}{GX + HY + 1} \quad (3)$$

The filter coefficient calculation portion 32 refers to the projection conversion coefficients calculated by the projection conversion coefficient calculation portion 31 and luminance correction coefficients stored in the luminance correction coefficient storage portion 33 to calculate filter coefficients to be used in the filtering performed by the correction processing section 40, that is, filter coefficients for determining the pixel values of the pixels in the post-correction image P1. Since the pixel values in the post-correction image P1 vary in accordance with the deformation factors $\epsilon_x$ and $\epsilon_y$, the filter coefficient calculation portion 32 calculates the filter coefficient for each of the deformation factors $\epsilon_x$ and $\epsilon_y$, and outputs the result to the correction processing section 40. The filter coefficients calculated by the filter coefficient calculation portion 32 are horizontal/vertical separation-type one-dimensional filter coefficients, and the filter coefficient calculation portion 32 separately calculates a horizontal filter coefficient according to the value of the horizontal deformation factor $\epsilon_x$ and a vertical filter coefficient according to the value of the vertical deformation factor $\epsilon_y$.

The luminance correction coefficient storage portion 33 stores in advance a luminance correction coefficient table in which luminance correction coefficients are related to a plurality of values of the horizontal and vertical deformation factors $\epsilon_x$ and $\epsilon_y$. The luminance correction coefficients are coefficients for correcting luminance deviation due to trapezoidal distortion, and the filter coefficient calculation portion 32 corrects the luminance to be uniform by multiplying each of the calculated filter coefficients by a luminance correction coefficient.

Figure 5:
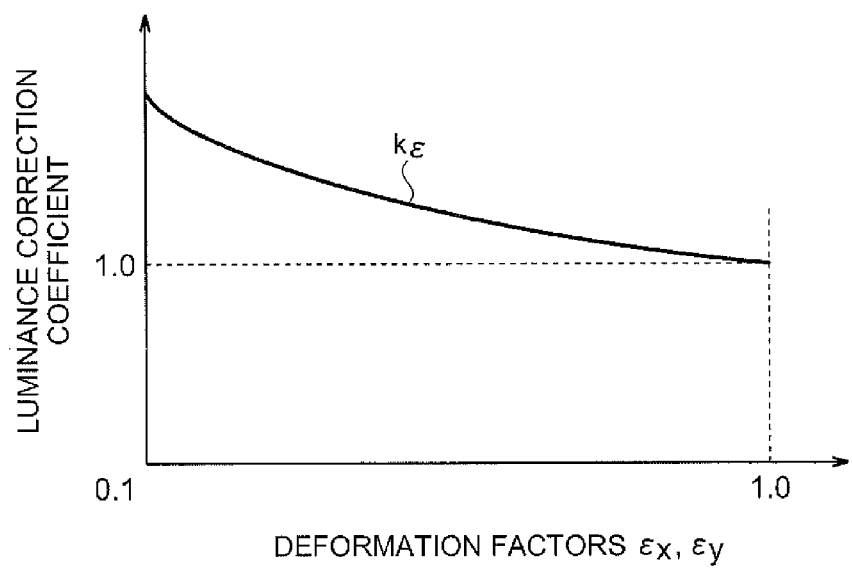
FIG. 5 shows a graph for describing a luminance correction coefficient.

FIG. 5 shows a graph for describing the luminance correction coefficient and illustrates the relationship between the deformation factors and the luminance correction coefficient.

The luminance correction coefficient is so set that it is 1 when the deformation factors $\epsilon_x$ and $\epsilon_y$ are 1.0 (unity) and increases as the deformation factors $\epsilon_x$ and $\epsilon_y$ decrease, as shown in FIG. 5. The reason for this is that a portion where the deformation factors $\epsilon_x$ and $\epsilon_y$ are smaller (that is, a portion where a1/a0 is smaller) is enlarged by a greater amount on the projection surface S and the luminance is lower accordingly. To compensate the decrease in luminance, the luminance correction coefficient is so related to the deformation factors $\epsilon_x$ and $\epsilon_y$ that the luminance increases as the deformation factors $\epsilon_x$ and $\epsilon_y$ decrease.

Figure 6:
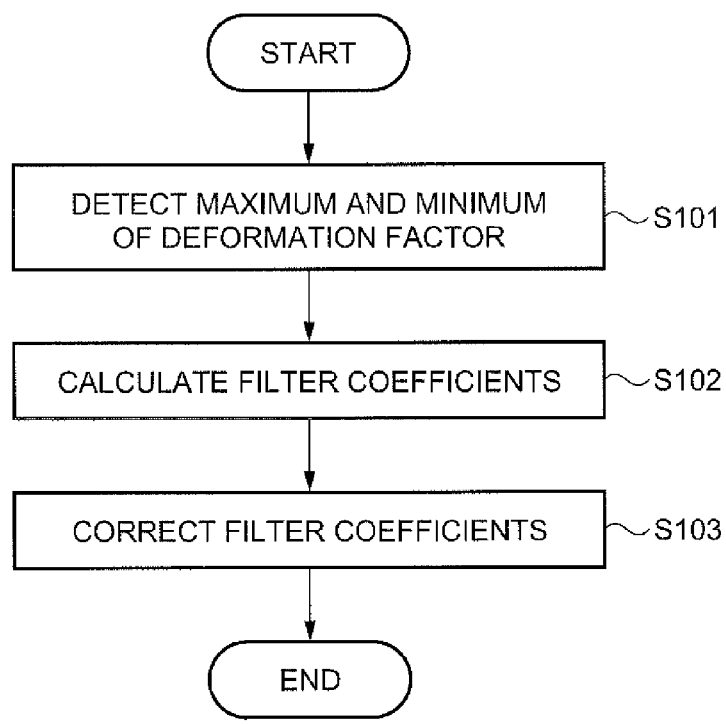
FIG. 6 shows a flowchart for describing the action of a filter coefficient calculation portion.

FIG. 6 shows a flowchart for describing the action of the filter coefficient calculation portion 32.

When the projector 1 is installed and the inclination information is inputted from the control unit 20, the filter coefficient calculation portion 32 acts in accordance with the flowchart shown in FIG. 6. It is assumed that the filter coefficient calculation portion 32 first calculates one of the vertical and horizontal filter coefficients, the horizontal filter coefficient.

In step S101, the filter coefficient calculation portion 32 detects a maximum and a minimum of the horizontal deformation factor $\epsilon_x$, as shown in FIG. 6. The position where the deformation factor $\epsilon_x$ is maximized or minimized is a position where the distance to the projection surface S is maximized or minimized and which is one of the four apexes of the image. The filter coefficient calculation portion 32 therefore calculates the deformation factor $\epsilon_x$ at each of the four apexes based on the projection conversion coefficients and extracts a maximum and a minimum of the calculated deformation factors $\epsilon_x$. The distribution of the deformation factor $\epsilon_x$ changes with the inclination of the projector 1 with respect to the projection surface S. That is, the deformation factor $\epsilon_x$ generally decreases as the inclination of the projector 1 increases (for example, ranging from 0.5 to 0.8), whereas the deformation factor $\epsilon_x$ generally increases as the inclination of the projector 1 decreases (for example, ranging from 0.8 to 1.0).

In step S102, the filter coefficient calculation portion 32 calculates horizontal filter coefficients corresponding to a plurality of deformation factors $\epsilon_x$ in accordance with the range of the deformation factor $\epsilon_x$ (from minimum to maximum). The filter coefficient calculation portion 32 in this embodiment divides the range including the minimum and the maximum of the deformation factor $\epsilon_x$ at intervals of 0.1 and derives filter coefficients corresponding to the divided ranges. For example, when the minimum of the deformation factor $\epsilon_x$ is 0.75 and the maximum of the deformation factor $\epsilon_x$ is 1.0, four filter coefficients corresponding to four deformation factors $\epsilon_x$ of 0.7, 0.8, 0.9, and 1.0 are calculated. To prevent a moiré pattern or any other harmful phenomenon from being produced in the post-correction image P1, the filter coefficients are, for example, desirably so determined that they function as a lowpass filter having a cutoff frequency of one-half the deformation factor. Further, the filter coefficient calculation portion 32 normalizes the sum of the filter coefficients to be one.

In step S103, the filter coefficient calculation portion 32 corrects the horizontal filter coefficients based on the luminance correction coefficient table stored in the luminance correction coefficient storage portion 33. The filter coefficient calculation portion 32 corrects the filter coefficients by multiplying the filter coefficient for each of the deformation factors $\epsilon_x$ that is generated in step S102 by the luminance correction coefficient corresponding to the deformation factor $\epsilon_x$. That is, consider a certain value of the horizontal deformation factor $\epsilon_x$, and let $h_\epsilon[i]$ (i denotes a symbol number) be a pre-correction filter coefficient calculated in step S102 and $k_\epsilon$ be the luminance correction coefficient corresponding to the deformation factor $\epsilon_x$. A post-correction filter coefficient $h_\epsilon[i]'$ is then expressed by Expression (4).

$$h_\epsilon[i]' = h_\epsilon[i] \times k_\epsilon \qquad (4)$$

The filter coefficient calculation portion 32 then calculates the vertical filter coefficients in accordance with the flowchart shown in FIG. 6 as in the same manner the horizontal filter coefficients are calculated. That is, the filter coefficient calculation portion 32 detects a maximum and a minimum of vertical deformation factor $\epsilon_y$ in step S101 and calculates the vertical filter coefficients corresponding to a plurality of deformation factors $\epsilon_y$ in accordance with the range of the deformation factor $\epsilon_y$ (from minimum to maximum) in step S102. In step S103, the filter coefficient calculation portion 32 refers to the luminance correction coefficient table to correct the generated vertical filter coefficients.

Referring back to FIG. 4, the correction processing section 40 includes a projection conversion coefficient storage portion 41, a filter coefficient storage portion 42, a deformation factor calculation portion 43, a frame memory 44, and a filter operation portion 45. The correction processing section 40 performs trapezoidal distortion correction filtering on the image information successively inputted from the image processing unit 24 based on the projection conversion coefficients and the filter coefficient for each of the deformation factors, which are produced by the parameter correction section 30, and outputs the processed image information to the liquid crystal driver 14.

The projection conversion coefficient storage portion 41 stores the projection conversion coefficients calculated by the projection conversion coefficient calculation portion 31. The filter coefficient storage portion 42 stores the filter coefficient calculated by the filter coefficient calculation portion 32 for each of the deformation factors $\epsilon_x$ and $\epsilon_y$.

The deformation factor calculation portion 43 calculates the deformation factors $\epsilon_x$ and $\epsilon_y$ in the pixels in the post-correction image P1 that are processed by the filter operation portion 45 and outputs the calculated deformation factors $\epsilon_x$ and $\epsilon_y$ to the filter operation portion 45. Specifically, for a pixel to be processed and pixels therearound in the post-correction image P1, the deformation factor calculation portion 43 derives pre-correction positions, that is, corresponding positions in the pre-correction image P0, by using the projection conversion coefficients. The deformation factor calculation portion 43 then calculates the deformation factors $\epsilon_x$ and $\epsilon_y$ in accordance with the definition of the deformation factors $\epsilon_x$ and $\epsilon_y$ described above.

The frame memory 44 successively receives the pre-correction image information (pixel values) inputted from the image processing unit 24. The filter operation portion 45 then performs the filtering on the image information on a frame basis stored in the frame memory 44 to sequentially determine the pixel values of the pixels in the post-correction image P1. Specifically, the filter operation portion 45 processes one of the pixels that form the post-correction image P1 by identifying and extracting the pixel value of a pixel to be referenced (reference pixel) from the image information representing the pre-correction image P0 and stored in the frame memory 44 based on the projection conversion coefficients, reading the filter coefficients corresponding to the deformation factors calculated by the deformation factor calculation portion 43 from the filter coefficient storage portion 42, and performing the filtering using the read filter coefficients on the pixel value of the reference pixel to determine a new pixel value. When no filter coefficients corresponding to the deformation factors calculated by the deformation factor calculation portion 43 are stored in the filter coefficient storage portion 42, filter coefficients corresponding to deformation factors closest to the deformation factors being processed may be used, or deformation factors in the vicinity of the deformation factors being processed may be interpolated and corresponding filter coefficients may be derived.

The filter operation portion 45 sequentially performs the filtering in the horizontal direction and the filtering in the vertical direction on the reference pixel and then on the rest of the pixels. The filter operation portion 45 then outputs the processed image information to the liquid crystal driver 14. As a result, the input image Pi is projected on the projection surface S with the trapezoidal distortion corrected and luminance deviation corrected.

Since the projection conversion coefficient calculation portion 31 and the filter coefficient calculation portion 32 in the parameter generation section 30 only need to calculate new parameters when the inclination of the projector 1 with respect to the projection surface S is changed, high-speed processing is not necessarily essential. The projection conversion coefficient calculation portion 31 and the filter coefficient calculation portion 32 are therefore desirably achieved by software. On the other hand, the correction processing section 40 is desirably achieved by hardware because it needs to process sequentially inputted image information at high speed.

As described above, the projector 1 according to this embodiment provides the following advantageous effect.

1. According to the projector 1 of this embodiment, since luminance deviation is corrected by adjusting the filter coefficients for correcting trapezoidal distortion, the circuit that corrects trapezoidal distortion (correction processing section 40) based on the filtering can also make the luminance uniform. That is, it is not necessary to newly add a circuit for making the luminance uniform.

2. According to the projector 1 of this embodiment, since a maximum and a minimum of the deformation factors s, and $\epsilon_y$ are determined in step S101, and only filter coefficients corresponding to the range from the minimum to the maximum are calculated in step S102, the period necessary to calculate the filter coefficients can be shortened. Further, the storage capacity of the filter coefficient storage portion 42, which stores calculated filter coefficients, can be reduced.

In this embodiment, the filter coefficient calculation portion 32 that calculates filter coefficients in step S102 corresponds to a coefficient generation portion, and the filter coefficient calculation portion 32 that corrects the filter coefficients in step S103 corresponds to a coefficient adjustment portion.

Second Embodiment

A projector according to a second embodiment will be described below with reference to the drawings.

A projector 1 according to this embodiment has the same configuration as that in the first embodiment, but the action of the filter coefficient calculation portion 32 differs from that in the first embodiment.

Figure 7:
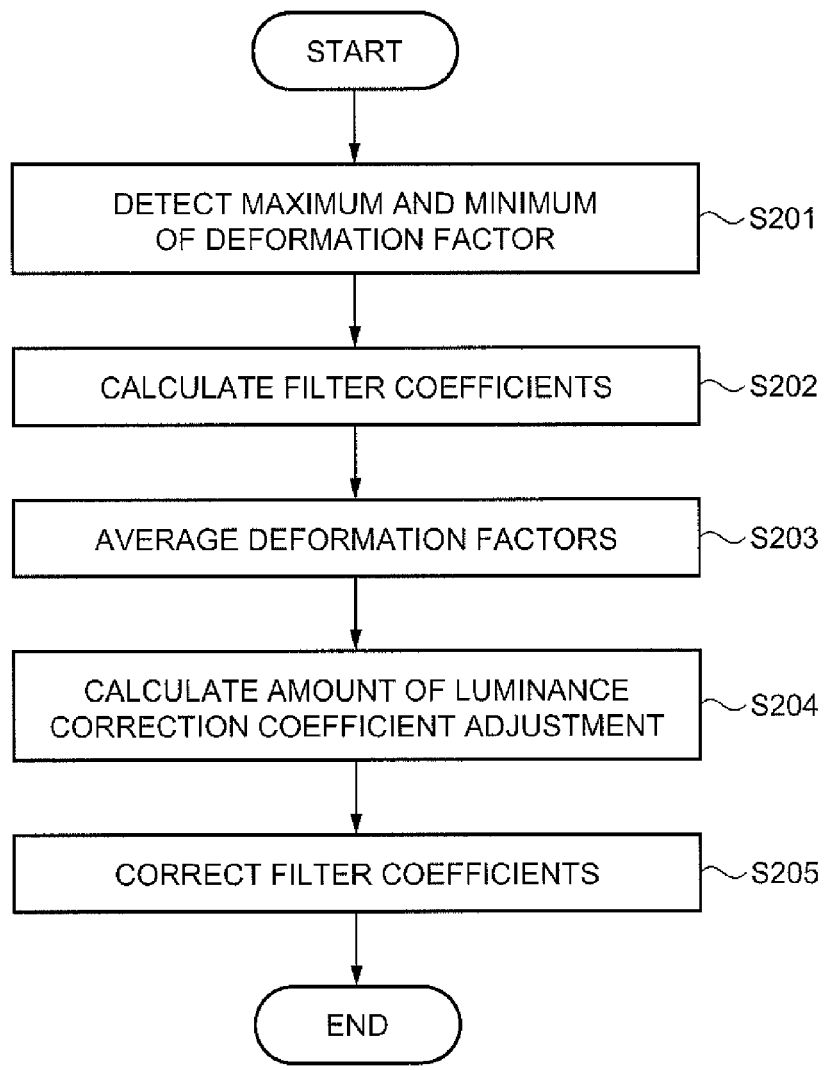
FIG. 7 shows a flowchart for describing the action of the filter coefficient calculation portion in a second embodiment.

FIG. 7 shows a flowchart for describing the action of the filter coefficient calculation portion 32 in this embodiment.

When the projector 1 is installed and the inclination information is inputted from the control unit 20, the filter coefficient calculation portion 32 acts in accordance with the flowchart shown in FIG. 7. It is also assumed that the filter coefficient calculation portion 32 first calculates one of the vertical and horizontal filter coefficients, the horizontal filter coefficient, as in the first embodiment.

In step S201, the filter coefficient calculation portion 32 detects a maximum and a minimum of the horizontal deformation factor $\epsilon_x$, as shown in FIG. 7. In step S202, the filter coefficient calculation portion 32 calculates horizontal filter coefficients corresponding to a plurality of deformation factors $\epsilon_x$ in accordance with the range of the deformation factor $\epsilon_x$ (from minimum to maximum). The actions in steps S201 and S202 are the same as those in steps S101 and S102 in the first embodiment, and no detailed description of the actions will therefore be made.

In step S203, the filter coefficient calculation portion 32 averages the horizontal deformation factors $\epsilon_x$ based on the projection conversion coefficients. In this process, the deformation factors $\epsilon_x$ in all the pixels may be averaged, or the deformation factors $\epsilon_x$ in pixels extracted at predetermined intervals may be averaged in order to shorten the period required for the process. Alternatively, the process may be further simplified by averaging the deformation factors $\epsilon_x$ at the four apexes.

In step S204, the filter coefficient calculation portion 32 calculates the amount of luminance correction coefficient adjustment for adjustment of the luminance correction coefficient. Specifically, the filter coefficient calculation portion 32 determines the amount of luminance correction coefficient adjustment in such a way that the luminance is unity (unchanged) when the deformation factor $\epsilon_x$ is equal to the average calculated in step S203. That is, in the luminance correction coefficient table stored in the luminance correction coefficient storage portion 33, let $k_m$ be the luminance correction coefficient for the deformation factor $\epsilon_x$ equal to the average, and the filter coefficient calculation portion 32 determines the amount of luminance correction coefficient adjustment q to be a value expressed by $q=k_m-1$.

In step S205, the filter coefficient calculation portion 32 uses the luminance correction coefficients stored in the luminance correction coefficient storage portion 33 and the amount of luminance correction coefficient adjustment calculated in step S204 to correct the generated horizontal filter coefficients. Specifically, the filter coefficient calculation portion 32 corrects the filter coefficients by multiplying the filter coefficient generated in step S202 for each of the deformation factors $\epsilon_x$ by the difference between the luminance correction coefficient corresponding to the deformation factor $\epsilon_x$ and the amount of luminance correction coefficient adjustment. That is, consider a certain value of the horizontal deformation factor $\epsilon_x$, and let $h_\epsilon[i]$ (i denotes a symbol number) be a pre-correction filter coefficient calculated in step S202 and $k_\epsilon$ be the luminance correction coefficient corresponding to the deformation factors $\epsilon_x$. A post-correction filter coefficient $h_\epsilon[i]'$ is then expressed by Expression (5).

$$h_\epsilon[i]'=h_\epsilon[i]\times(k_\epsilon-q) \tag{5}$$

The filter coefficient calculation portion 32 then calculates the vertical filter coefficients in accordance with the flowchart shown in FIG. 7 in the same manner as the horizontal filter coefficients are calculated. That is, the filter coefficient calculation portion 32 detects a maximum and a minimum of the vertical deformation factor $\epsilon_y$ in step S201 and calculates vertical filter coefficients corresponding to a plurality of deformation factors $\epsilon_y$ in accordance with the range of the deformation factor $\epsilon_y$ (from minimum to maximum) in step S202. In step S203, the vertical deformation factors $\epsilon_y$ are averaged, and in step S204, the amount of luminance correction coefficient adjustment is determined. In step S205, the luminance correction coefficients and the amount of luminance correction coefficient adjustment are used to correct the generated vertical filter coefficients.

Figure 8A:
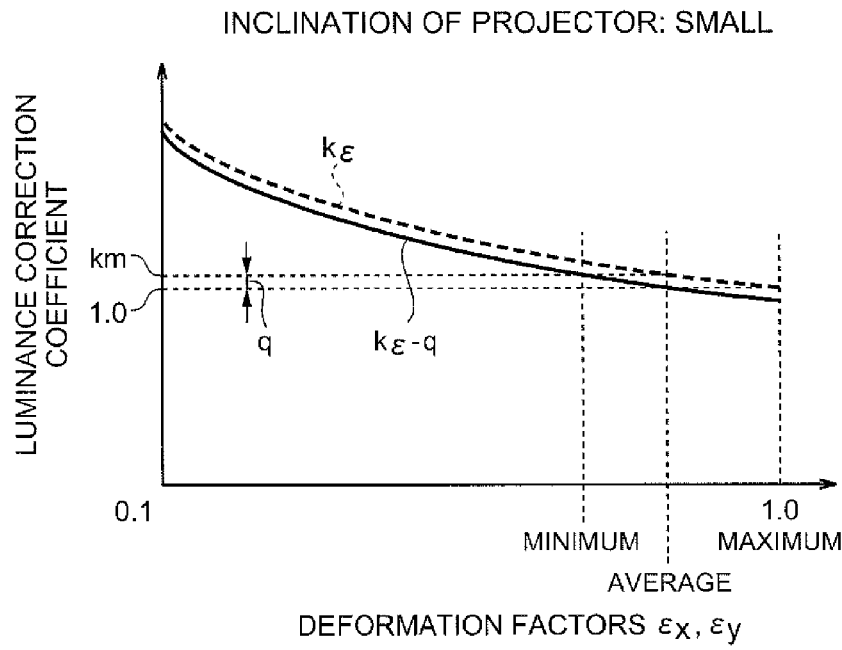
FIGS. 8A and 8B show graphs illustrating the relationship between the deformation factors and the luminance correction coefficient in the second embodiment.
Figure 8B:
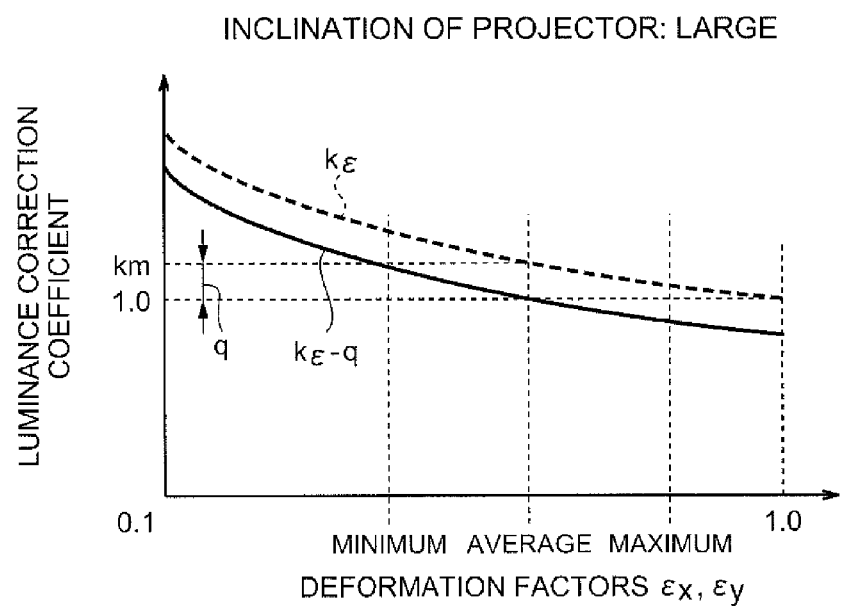

FIGS. 8A and 8B show graphs illustrating the relationship between the deformation factors and the luminance correction coefficient. FIG. 8A shows a graph in a case where the inclination of the projector 1 with respect to the projection surface S is relatively small, and FIG. 8B shows a graph in a case where the inclination of the projector 1 with respect to the projection surface S is relatively large.

Larger inclination of the projector 1 with respect to the projection surface S causes the minimum, the maximum, and the average of the deformation factors to be smaller and the luminance correction coefficient $k_m$ for the deformation factor equal to the average, that is, the amount of luminance correction coefficient adjustment q to increase, as shown in FIGS. 8A and 8B. That is, when the inclination of the projector 1 is large and hence the luminance tends to decrease, the correction of (increase in) the luminance is suppressed by a greater amount so that saturation of luminance in many pixels is prevented.

As described above, the projector 1 according to this embodiment provides the following advantageous effects as well as those provided in the first embodiment.

1. According to the projector 1 of this embodiment, since the filter coefficients for correcting trapezoidal distortion and the luminance are generated in accordance with the deformation factors $\epsilon_x$ and $\epsilon_y$ and adjusted in accordance with the average of the deformation factors $\epsilon_x$ and $\epsilon_y$, the luminance can be corrected appropriately by the amount corresponding to the average of the deformation factors $\epsilon_x$ and $\epsilon_y$, whereby an image having undergone the luminance correction will not be too bright or too dim.

In this embodiment, the filter coefficient calculation portion 32 that executes step S201 to detect a maximum and a minimum of the deformation factors corresponds to a range detection portion. The filter coefficient calculation portion 32 that executes step S202 to calculate the filter coefficients corresponds to a coefficient generation portion. The filter coefficient calculation portion 32 that executes step S203 to average the deformation factors corresponds to an average calculation portion. The filter coefficient calculation portion 32 that executes steps S204 and S205 to correct the filter coefficients corresponds to a coefficient adjustment portion. Further, $k_\epsilon$–q in Expression (5) corresponds to the amount of luminance correction.

Variations

The embodiments described above may be changed as follows.

In the embodiments described above, the luminance correction coefficient storage portion 33 stores the luminance correction coefficient table in which the luminance correction coefficients are related to a plurality of values of the deformation factors $\epsilon_x$ and $\epsilon_y$. The luminance correction coefficient table may alternatively store a mathematical expression that provides luminance correction coefficients as a function of the deformation factors $\epsilon_x$ and $\epsilon_y$.

In the embodiments described above, the deformation factor calculation portion 43 calculates the deformation factors $\epsilon_x$ and $\epsilon_y$ for each pixel but the calculation is not necessarily made this way. For example, the deformation factors $\epsilon_x$ and $\epsilon_y$ may be calculated for each area formed of a plurality of pixels.

In the embodiments described above, the projector 1 may alternatively be a three-panel projector that uses three liquid crystal light valves 12 that transmit red light, green light, and blue light respectively to modulate the color light fluxes into color image light or a projector that uses a single liquid crystal light valve 12 in which each pixel has sub-pixels transmissible of red light, green light, and blue light to modulate the color light fluxes into image light.

In the embodiments described above, the transmissive liquid crystal light valve 12 is used as the light modulator. A reflective liquid crystal light valve or any other reflective light modulator may alternatively be used as the light modulator. Further, a micromirror array device that modulates light emitted from a light source by controlling the exiting direction of the light incident on each micromirror that works as a pixel or any other similar device can also be used as the light modulator.

In the embodiments described above, the light source portion 11 is formed of the discharge-type light source lamp 11*a*. Alternatively, a solid-state light source, such as an LED (light emitting diode) light source and a laser light source, or any other light source can be used.

What is claimed is:

1. A projector that projects an image based on image information, the projector comprising:
   a display;
   a memory; and
   a processor configured to:
   generate filter coefficients used in filtering that corrects trapezoidal distortion of the image, the filter coefficients being generated in such a way that the trapezoidal distortion of the image is corrected during the filtering;
   store, in the memory, relationships between each of the generated filter coefficients and deformation factors each representing a degree of deformation of a post-correction image which is an image that would be projected by the display after the trapezoidal distortion correction, based on the respective filter coefficient, of the image;
   adjust each of the generated filter coefficients in such a way that a luminance deviation due to the trapezoidal distortion is corrected in accordance with the deformation factor corresponding to the respective filter coefficient based on the stored relationships;
   correct image information by performing the filtering that corrects trapezoidal distortion of the image based on the adjusted filter coefficients; and
   control the display to project a corrected image based on the corrected image information, wherein the processor is further configured to:
   adjust the amount of correction on the luminance in accordance with a range of possible values of the deformation factor corresponding to the respective filter coefficient in the corrected image information,
   detect a minimum and a maximum of the deformation factor in the image, and
   adjust the amount of correction on the luminance in such a way that the luminance is unchanged when the deformation factor corresponding to the respective filter coefficient has a predetermined value between the minimum and the maximum.

2. The projector according to claim 1, wherein the processor is further configured to multiply each of the generated filter coefficients by a luminance correction coefficient according to the deformation factor corresponding to the filter coefficient.

3. The projector according to claim 1, wherein the processor is further configured to:
   calculate a deformation factor for each position of a plurality of positions in the image; and
   correct the image information by performing the filtering by selecting one of the generated filter coefficients that corresponds to the calculated deformation factor for a position of the plurality of positions in the image.

4. The projector according to claim 1, wherein the processor is further configured to:
   calculate a deformation factor for each position of a plurality of positions in the image; and
   correct the image by performing the filtering by selecting one of the generated filter coefficients that corresponds to the calculated deformation factor for a position of the plurality of positions in the image.

5. The projector according to claim 1, the processor is further configured to:
   determine an average of the deformation factors in the image, and
   adjust the amount of correction on the luminance in such a way that the luminance is unchanged when the deformation factor corresponding to the respective filter coefficient is equal to the average.

6. The projector according to claim 1, wherein the deformation factors include a horizontal deformation factor and a vertical deformation factor for each of the filter coefficients.

7. The projector according to claim 6, wherein the horizontal deformation factor is calculated by dividing a distance between a pixel immediately to the left of a pixel of interest in the horizontal direction in the post-correction image corresponding to the respective filter coefficient and a pixel immediately to the right of the pixel of interest in the horizontal direction in the post-correction image, and a distance between a pixel immediately to the left of a pixel of interest in the horizontal direction in the image corresponding to the respective filter coefficient and a pixel immediately to the right of the pixel of interest in the horizontal direction in the image.

8. The projector according to claim 7, wherein the pixel of interest is within a vicinity of one of four apexes of the image.

9. The projector according to claim 6, wherein the vertical deformation factor is calculated by dividing a distance between a pixel immediately above a pixel of interest in the post-correction image corresponding to the respective filter coefficient and a pixel immediately vertically below the pixel of interest in the post-correction image, and a distance between a pixel immediately vertically above a pixel of interest in the image corresponding to the respective filter coefficient and a pixel immediately vertically below the pixel of interest in the image.

10. The projector according to claim 9, wherein the pixel of interest is within a vicinity of one of four apexes of the image.

11. A method for controlling a projector that projects an image based on image information, the method comprising:
generating, by a processor, filter coefficients used in filtering that corrects trapezoidal distortion of the image, the filter coefficients being generated in such a way that the trapezoidal distortion of the image is corrected;
store, in the memory by the processor, relationships between each of the generated filter coefficients and deformation factors each representing a degree of deformation of a post-correction image, which is an image that would be projected by the display after the trapezoidal distortion correction, based on the respective filter coefficient, of the image;
adjusting, by the processor, each of the generated filter coefficients in such a way that a luminance deviation due to the trapezoidal distortion is corrected in accordance with the deformation factor corresponding to the respective filter coefficient based on the stored relationships;
correcting, by the processor, image information of the image by performing the filtering that corrects trapezoidal distortion of the image based on the adjusted filter coefficients; and
controlling, by the processor, a display to project a corrected image based on the corrected image information, wherein
the method further comprises detecting a minimum and a maximum of the deformation factor corresponding to the respective filter coefficient; and
in the adjustment step:
the amount of correction on the luminance is adjusted in accordance with a range of possible values of the deformation factor corresponding to the respective filter coefficient in the corrected image information, and
the amount of correction on the luminance is adjusted in such a way that the luminance is unchanged when the deformation factor corresponding to the respective filter coefficient has a predetermined value between the minimum and the maximum.

12. The method for controlling a projector according to claim 11, wherein in the adjustment step, each of the filter coefficients is multiplied by a luminance correction coefficient according to the deformation factor corresponding to the filter coefficient.

13. The method for controlling a projector according to claim 11, further comprising:
calculating a deformation factor for each position of a plurality of positions in the image; and
correcting the image information by performing the filtering by selecting one of the generated filter coefficients that corresponds to the calculated deformation factor for a position of the plurality of positions in the image.

14. The method for controlling a projector according to claim 11, wherein the correction step includes calculating a deformation factor for each position of a plurality of positions in the image; and performing the filtering by selecting one of the generated filter coefficients that corresponds to the calculated deformation factor for a position of the plurality of positions in the image.

15. The method for controlling a projector according to claim 11, further comprising determining an average of the deformation factors in the image, wherein in the adjustment step, the amount of correction on the luminance is adjusted in such a way that the luminance is unchanged when the deformation factor corresponding to the respective filter coefficient is equal to the average.

16. A projector that projects an image based on image information, the projector comprising:
a display;
a memory; and
a processor configured to:
generate filter coefficients used in filtering that corrects trapezoidal distortion of the image, the filter coefficients being generated in such a way that the trapezoidal distortion of the image is corrected during the filtering;
store, in the memory, relationships between each of the generated filter coefficients and deformation factors each representing a degree of deformation of a post-correction image, which is an image that would be projected by the display after the trapezoidal distortion correction, based on the respective filter coefficient, of the image;
adjust each of the generated filter coefficients in such a way that a luminance deviation due to the trapezoidal distortion is corrected in accordance with the deformation factor corresponding to the respective filter coefficient based on the stored relationships;
correct image information by performing the filtering that corrects trapezoidal distortion of the image based on the adjusted filter coefficients; and
control the display to project a corrected image based on the corrected image information, wherein
the deformation factors include a horizontal deformation factor and a vertical deformation factor for each of the filter coefficients, and
the horizontal deformation factor is calculated by dividing a distance between a pixel immediately to the left of a pixel of interest in the horizontal direction in the post-correction image corresponding to the respective filter coefficient and a pixel immediately to the right of the pixel of interest in the horizontal direction in the post-correction image, and a distance between a pixel immediately to the left of a pixel of interest in the horizontal direction in the image corresponding to the respective filter coefficient and a pixel immediately to the right of the pixel of interest in the horizontal direction in the image.

17. A projector that projects an image based on image information, the projector comprising:
a display;
a memory; and
a processor configured to:
generate filter coefficients used in filtering that corrects trapezoidal distortion of the image, the filter coefficients being generated in such a way that the trapezoidal distortion of the image is corrected during the filtering;

store, in the memory, relationships between each of the generated filter coefficients and deformation factors each representing a degree of deformation of a post-correction image, which is an image that would be projected by the display after the trapezoidal distortion correction, based on the respective filter coefficient, of the image;

adjust each of the generated filter coefficients in such a way that a luminance deviation due to the trapezoidal distortion is corrected in accordance with the deformation factor corresponding to the respective filter coefficient based on the stored relationships;

correct image information by performing the filtering that corrects trapezoidal distortion of the image based on the adjusted filter coefficients; and control the display to project a corrected image based on the corrected image information, wherein the deformation factors include a horizontal deformation factor and a vertical deformation factor for each of the filter coefficients, and the vertical deformation factor is calculated by dividing a distance between a pixel immediately above a pixel of interest in the post-correction image corresponding to the respective filter coefficient and a pixel immediately vertically below the pixel of interest in the post-correction image, and a distance between a pixel immediately vertically above a pixel of interest in the image corresponding to the respective filter coefficient and a pixel immediately vertically below the pixel of interest in the image.

* * * * *